United States Patent [19]
Ohsugi et al.

[11] Patent Number: 5,599,883
[45] Date of Patent: Feb. 4, 1997

[54] CURABLE RESIN COMPOSITION COMPRISING AN ACRYLIC COPOLYMER CONTAINING AN ORGANOHYDROGENPOLYSILOXANE MACROMONOMER UNIT AND AN ALKENYL GROUP-CONTAINING ACRYLIC MONOMER UNIT

[75] Inventors: Hiroharu Ohsugi, Hirakata; Shigeru Mikami, Nishinomiya; Hisaki Tanabe, Yawata; Mitsuhiro Takarada, Takasaki; Yuji Yoshikawa, Annaka, all of Japan

[73] Assignee: Nippon Paint Co., Ltd., Japan

[21] Appl. No.: 534,588

[22] Filed: Sep. 27, 1995

Related U.S. Application Data

[62] Division of Ser. No. 262,291, Jun. 20, 1994.

[30] Foreign Application Priority Data

Jun. 21, 1993 [JP] Japan ................................ 5-174917
Dec. 3, 1993 [JP] Japan ................................ 5-339417

[51] Int. Cl.$^6$ ................................................. C08F 283/00
[52] U.S. Cl. .......................... 525/474; 525/479; 528/15; 528/25; 528/31; 528/32
[58] Field of Search ................................. 525/474, 479; 528/15, 25, 31, 32

[56] References Cited

U.S. PATENT DOCUMENTS

| | | | |
|---|---|---|---|
| 4,690,986 | 9/1987 | Sasaki et al. | 525/479 |
| 5,256,754 | 10/1993 | Takanada et al. | 528/31 |
| 5,321,082 | 6/1994 | Ohsugi et al. | 525/100 |
| 5,332,796 | 7/1994 | Yoshikawa et al. | 525/474 |

*Primary Examiner*—Mark D. Sweet
*Attorney, Agent, or Firm*—Millen, White, Zelano & Branigan, P.C.

[57] ABSTRACT

A curable resin composition containing (a) a homo- or copolymer of an organohydrogenpolysiloxane macromonomer, (b) an alkenyl group-containing polymer, and (c) a hydrosilylation catalyst is disclosed. The organohydrogenpolysiloxane macromonomer may be incorporated into a single polymer entity together with an alkenyl group-containing monomer unit to produce a self-crosslinkable copolymer.

11 Claims, No Drawings

CURABLE RESIN COMPOSITION COMPRISING AN ACRYLIC COPOLYMER CONTAINING AN ORGANOHYDROGENPOLYSILOXANE MACROMONOMER UNIT AND AN ALKENYL GROUP-CONTAINING ACRYLIC MONOMER UNIT

This is a division of the application Ser. No. 080/262,291 filed Jun. 20, 1994.

FIELD OF THE INVENTION

This invention relates to a novel curable resin composition. More particularly, it relates to a novel curable resin composition having excellent weatherability and other physico-chemical properties.

BACKGROUND OF THE INVENTION

A variety of curable resin compositions are known in the coating industry including those comprising hydroxyl group-containing acrylic or polyester polymers and a crosslinker such as melamine resins or organic polyisocyanates. The melamine resin-crosslinking compositions suffer not only from volumetric shrinkage upon curing due to the emanation of lower alkanol by-products but also from a decreased weatherability particularly when exposed to acid rain, due to the presence of triazine nuclei. The polyisocyanate crosslinking system has problems of toxicity, decreasing weatherability with time and yellowing.

Japanese Laid Open (Kokai) Patent Application Nos. 36109/82 and 155660/83 disclose a system having an enhanced weatherability comprising room temperature-curable alkoxysilyl group-bearing acrylic polymers. This system has certain defects in that the curing reaction proceeds slowly, that the cured product can be blotted with by-products produced by the hydrolysis of residual alkoxysilyl groups and that its rust prevention property is not satisfactory.

Japanese Patent Publication (Kokoku) No. 33152/88 discloses a thermosetting resin system utilizing a reaction between an alkoxysilyl component and a hydroxyl group-containing resin component. This system is also disadvantageous in that its curing reaction proceeds slowly and the resulting cured film exhibits poor salt spray resistance.

It has long been known in the art to crosslink vinylpolysiloxanes with organohydrogenpolysiloxanes in the presence of a platinum catalyst. Unfortunately, the cured product of this composition is swellable with conventional organic solvents and thus exhibits poor solvent resistance as well as poor alkali resistance. This composition also has a poor overlaying property when used for coating purposes. These defects have precluded the composition from its application to coating compositions of general use.

In addition, the above hydrosilyl reaction by the organohydrogenpolysiloxanes has been utilized to obtain rubbery resilient products by reacting the organohydrogenpolysiloxanes with alkenyl group-bearing polymers or oligomers in the presence of a hydrosilylation catalyst such as chloroplatinic acid. See, Japanese Laid Open Patent Application Nos. 138230/89, 95266/82, 200807/82 and 277645/82.

All of the above compositions are reactive even at room temperature and, therefore, at least the catalyst must be kept separately from the remainder of the compositions immediately prior to use. Moreover, rubbery products are not suitable for coating purposes in which mechanical strength is a requisite for the coating films. Organohydrogenpolysiloxane components used in known compositions generally exhibit a poor compatibility with alkenyl group-containing polymers or oligomers which also contributes to decreased mechanical strength of the resulting coating films.

It is, therefore, a principal object of the present invention to provide a curable resin composition utilizing a hydrosilylation reaction of an alkenyl group as the curing mechanism thereof in which the hydrosilating component and the alkenyl group-containing component are readily compatible with each other.

It is another object of this invention to provide a curable resin composition which has excellent mechanical strength, weatherability, acid resistance, alkali resistance, waterproofness, salt spray resistance, solvent resistance, overlaying property and other properties.

It is a further object of this invention to provide a curable resin composition which is curable without volumetric shrinkage and thus may be used for molding purposes.

It is a still further object of this invention to provide a curable resin composition which may be used for coating purposes as solventless or high solids coating compositions.

SUMMARY OF THE INVENTION

According to this invention, the above and other objects may be accomplished by utilizing as the hydrosilylating component polymer of a heterofunctional organohydrogenpolysiloxane macromonomer having a (meth)-acryloyloxypropyl group attached to the silicon atom.

In the first composition aspect, the present invention provides a curable resin composition comprising:

(a) a polymer having a plurality of alkenyl groups in the molecule and a number average molecular weight of from 300 to 20,000 and an iodine number of from 50 to 250;

(b) a homopolymer of an organohydrogenpolysiloxane macromonomer having a silicon-hydrogen bond and a 3-(meth)-acryloyloxypropyl group attached to the silicon atom or a copolymer of said macromonomer with an ethylenically unstaturated monomer; and (c) a catalytically effective amount of a hydrosilylation catalyst.

In the second composition aspect, the present invention provides a curable resin composition comprising:

(a) an acrylic copolymer having (i) an organohydrogenpoly-siloxane macromonomer unit having a silicon-hydrogen bond and a 3-(meth)acryloyloxypropyl group attached to the silicon atom, (ii) an alkenyl group-containing acrylic monomer unit, and optionally (iii) an ethylenically unsaturated monomer unit, and (b) a catalytically effective amount of a hydrosilylation catalyst.

DETAILED DESCRIPTION OF THE PREFERRED EMBODIMENT

As will be apparent, the organohydrogenpolysiloxane macromonomer used in the present invention may polymerize itself or polymerize with other monomers to produce a polymeric crosslinker for alkenyl group-containing polymers. Alternatively, it may be copolymerized with an alkenyl group-containing acrylic monomer to produce a self-curable acrylic resin relying on the hydrosilylation reaction. By so doing, the problem of poor compatibility of the organohydrogenpolysiloxane component with the alkenyl component can be substantially ameliorated or eliminated.

Macromonomers

Organohydrogenpolysiloxane macromonomers having a silicon-hydrogen bond and a (meth)acryloyloxypropyl group attached to the silicon atom are known. For example, Japanese Laid Open (Kokai) patent application No. 169589/92 discloses macromonomers of the average composition formula I:

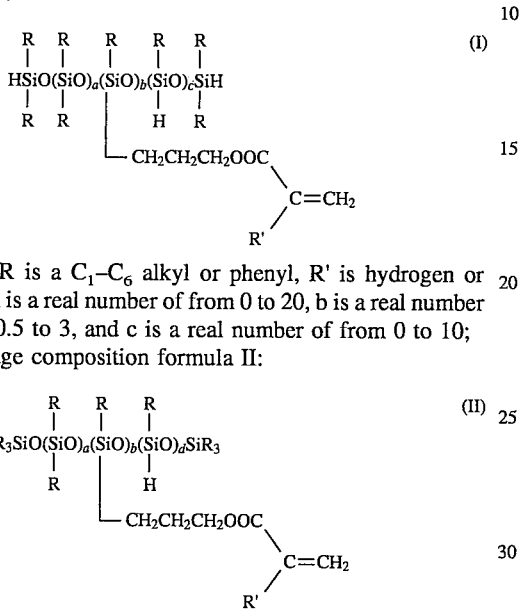

wherein R is a $C_1$–$C_6$ alkyl or phenyl, R' is hydrogen or methyl, a is a real number of from 0 to 20, b is a real number of from 0.5 to 3, and c is a real number of from 0 to 10; the average composition formula II:

$$R_3SiO(SiO)_a(SiO)_b(SiO)_dSiR_3 \quad \text{(II)}$$
with R, H substituents and —CH$_2$CH$_2$CH$_2$OOC—C(R')=CH$_2$ side group wherein R, R', a and b are as defined, and d is a real number of from 1 to 10; and the average composition formula III:

$$CH_2=C(R')COOCH_2CH_2CH_2(SiO)_cSiR''' \quad \text{(III)}$$
with R, R'' substituents wherein R, R' and c are as defined, R'' is the same as R or a group —OSi(R)$_2$H, and R''' is hydrogen when R'' is the same as R or otherwise a group —OSi(R)$_2$H.

Homo- or copolymers of the above macromonomers are unknown. It is possible to give a variety of properties to the curable resin composition containing the homo- or copolymers of the above macromonomers by the selection of suitable macromonomers and comonomers and/or by varying the proportion of comonomers. Macromonomers having phenyl-substituted siloxane units are preferable. Examples of macromonomers of the average composition formula I, II or III are as follows:

Formula I Group

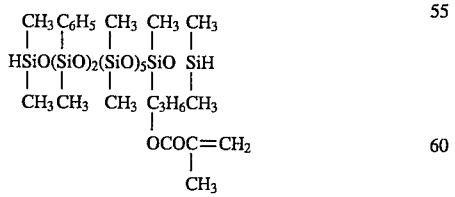

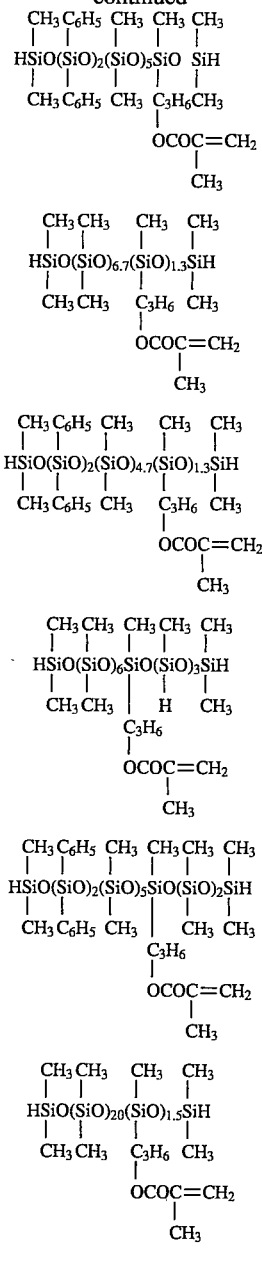

Formula II Group

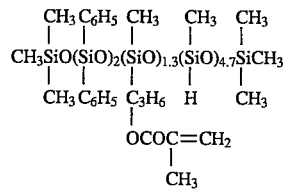

-continued

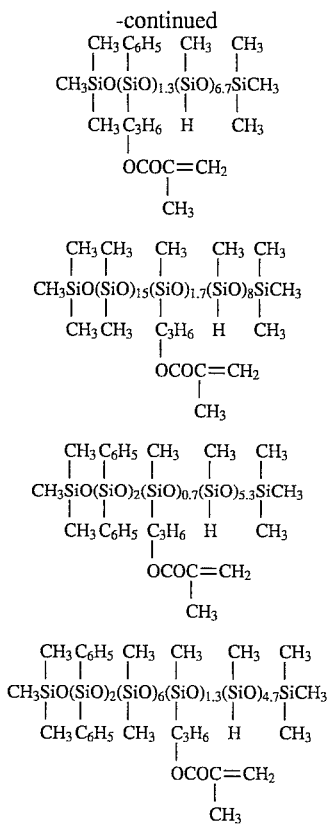

Formula III Group $$CH_2=C(CH_3)COOC_3H_6SiH \begin{matrix} CH_3 \\ | \\ | \\ CH_3 \end{matrix}$$

$$CH_2=C(CH_3)COOC_3H_6SiOSiH \begin{matrix} CH_3 & CH_3 \\ | & | \\ | & | \\ CH_3 & CH_3 \end{matrix}$$

$$CH_2=C(CH_3)COOC_3H_6(SiO)_5SiH \begin{matrix} CH_3 & CH_3 \\ | & | \\ | & | \\ CH_3 & CH_3 \end{matrix}$$

$$CH_2=C(CH_3)COOC_3H_6(SiO)_{10}SiH \begin{matrix} CH_3 & CH_3 \\ | & | \\ | & | \\ CH_3 & CH_3 \end{matrix}$$

$$CH_2=C(CH_3)COOC_3H_6Si(SiH)_3 \begin{matrix} CH_3 \\ | \\ | \\ CH_3 \end{matrix}$$

Copolymerizable monomers

Examples of monomers which are copolymerized with a organohydrogenpolysiloxane macromonomer when employing a first composition aspect of this invention include, inter alia, acrylic monomers such as methyl (meth)acrylate, ethyl (meth)acrylate, n-butyl (meth)acrylate, isobutyl (meth)acrylate, t-butyl (meth)acrylate, 2-ethylhexyl (meth)acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, adduct of 2-hydroxyethyl (meth)acrylate and ε-caprolactone (e.g. PLACCEL FM1 sold by Daicel Chemical Industries, Ltd.), glycidyl (meth)acrylate, 3-trimethoxysilylpropyl (meth)acrylate, 3-triethoxysilylpropyl (meth)acrylate, 3-dimethoxymethylsilylpropyl (meth)acrylate, (meth)acrylic acid, 2-acryloylamino-2-methylpropane sulfonic acid, acid phosphoxypropyl (meth)acrylate, tributyltin (meth)acrylate, (meth)acrylamide, (meth)acryloylisocyanate, 2-isocyanatoethyl (meth)acrylate and the like. Other copolymerizable monomers include styrene, α-methylstyrene, itaconic acid, maleic acid, vinyl acetate, allyl acetate, vinyltrimethoxysilane, vinyltriethoxysilane, vinylmethyldimethoxysilane, vinylmethyldiethoxysilane and the like.

Polymerization of macromonomer

Conventional solution polymerization method may be employed for producing homo- or copolymers of the macromonomer using a monomeric composition consisting of 20 to 100%, preferably 40 to 100% by weight of the macromonomer and 0 to 80%, preferably 0 to 60% by weight of a monomer copolymerizable therewith. A cured product having a crosslinking density sufficient to exhibit satisfactory mechanical properties would not be obtained at a proportion of the macromonomer less than 20% by weight in the monomeric composition. The resulting homo- or copolymers preferably have a number average molecular weight of from 1,000 to 30,000 and a hydrosilyl group concentration of greater than $1 \times 10^{-3}$ mol/g.

Alkenyl group-containing polymer

Alkenyl group-containing polymers used in the present invention must have an iodine number of from 50 to 250 and a number average molecular weight of from 300 to 20,000. Specifically, they are alkenyl group-containing polyether, acrylic, polyester or epoxy resins.

Alkenyl group-containing polyether resins may be produced by the ring opening polymerization of an alkenyl group-containing epoxide using an active hydrogen compound such as water or mono- or polyols as an initiator. A ring opening polymerization product of allyl glycidyl ether is commercially available as SANTLINK XI-100 (number average M.W. 1200, iodine number 212, Monsanto). Ring opening polymerization products of vinylcyclohexane-1,2-epoxide initiated with butanol, allyl alcohol or propargyl alcohol are commercially available as HPE series from Daicel Chemical Industries, Ltd. Also see, Japanese Laid Open (Kokai) Patent Application No. 23829/1992.

HPE-1030(M.W.450,iodine No. 170):

HPE-1030(M.W.450, iodine No. 170):

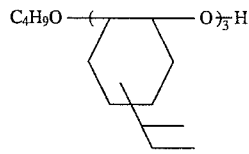

HPE-1060(M.W.820, iodine No. 185):

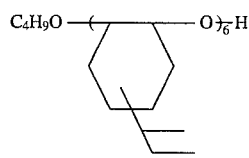

HPE-10601A(M.W.890, iodine No. 170):

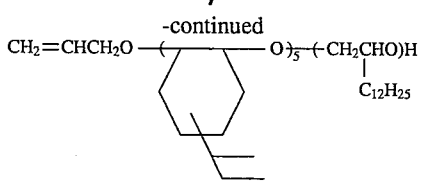

HPE-10602A(M.W.980, iodine No. 130):

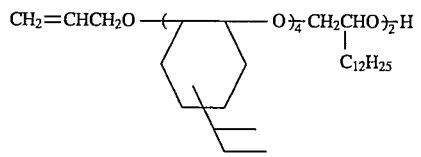

HPE-10601C(M.W.780, iodine No. 196):

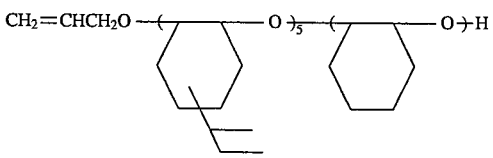

HPE-10602C(M.W.750, iodine No. 170):

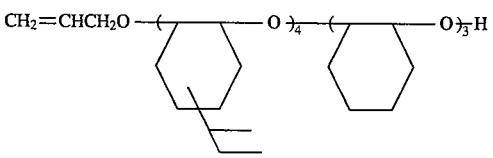

HPE-Pr3(M.W.430, iodine No. 236):

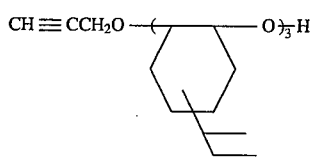

Alkenyl group-containing acrylic resins may be produced by polymerizing an alkenyl group-containing acrylic monomer alone or in combination with other monomers copolymerizable therewith. Examples of alkenyl group-containing acrylic monomers include allyl (meth)acrylate, 2-butenyl (meth)acrylate, 3-methyl-3-butenyl (meth)acrylate, 3-methyl-2-butenyl (meth)acrylate, cyclohexenylmethyl (meth)acrylate, 2-methyl-2-propenyl (meth)acrylate, 3-heptenyl (meth)acrylate, 4-hexenyl (meth)acrylate, CYCLOMER MF-401 (1:1 adduct of 2-hydroxethyl methacrylate and vinylcyclohexene monoepoxide sold Daicel Chemical Industries, Ltd.) and the like. These alkenyl group-containing monomers may be produced by reacting the corresponding alcohols with (meth)acryloyl chloride or transesterifying with an alkyl (meth)acrylate. Alkenyl group-containing monomers produced by reacting an olefin alcohol with (meth)acryloylisocyanate or 2-isocyanatoethyl (meth)acrylate may also be used.

Examples of other monomers which are copolymerized with the alkenyl group-containing acrylic monomer include, inter alia, acrylic monomers such as methyl (meth)acrylate, ethyl (meth)acrylate, n-butyl (meth)acrylate, isobutyl (meth)acrylate, t-butyl (meth)acrylate, 2-ethylhexyl (meth)acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, adduct of 2-hydroxyethyl (meth)acrylate and ε-caprolactone (e.g. PLACCEL FM1 sold by Daicel Chemical Industries, Ltd.), glycidyl (meth)acrylate, 3-trimethoxysilylpropyl (meth)acrylate, 3-triethoxysilylpropyl (meth)acrylate, 3-dimethoxymethylsilylpropyl (meth)acrylate, (meth)acrylic acid, 2-acryloylamino-2-methylpropane sulfonic acid, acid phosphoxypropyl (meth)acrylate, tributyltin (meth)acrylate, (meth)acrylamide, (meth)acryloylisocyanate, 2-isocyanatoethyl (meth)acrylate and the like. Other copolymerizable monomers include styrene, α-methylstyrene, itaconic acid, maleic acid, vinyl acetate, allyl acetate, vinyltrimethoxysilane, vinyltriethoxysilane, vinylmethyldimethoxysilane, vinylmethyldiethoxysilane and the like. These non-acrylic monomers are preferably used in a proportion less than 50% by weight.

Other methods for producing alkenyl group-containing acrylic resins include the reaction of hydroxyl group-containing acrylic resins with isocyanates or carboxylic acid anhydrides having the alkenyl function, the reaction of isocyanato group-containing acrylic resins with olefin alcohols, the reaction of carboxyl group-containing acrylic resins with alkenyl group-containing epoxide compounds, and the reaction of epoxide group-containing acrylic resins with alkenoic acid.

Hydroxyl group-containing acrylic resins may be produced by polymerizing hydroxyl group-containing acrylic monomers such as 2-hydroxyethyl (meth)acrylate, 4-hydroxybutyl (meth)acrylate, or an adduct of 2-hydroxyethyl(meth)acrylate and 68-caprolactone (e.g. PLACCEL FM series), or copolymerizing the hydroxyl group-containing acrylic monomer with copolymerizable acrylic and/or non-acrylic monomers.

Isocyanato group-containing acrylic resins may be produced by polymerizing isocyanato group-containing acrylic monomers such as (meth)acryloylisocyanate or 2-isocyanatoethyl (meth)acrylate, or copolymerizing the isocyanato group-containing acrylic monomer with copolymerizable acrylic and/or non-acrylic monomers.

Carboxyl group-containing acrylic resins may be produced by polymerizing (meth)acrylic acid and/or other carboxylic acid monomers such as itaconic or maleic acid, or copolymerizing the carboxylic acid monomer with copolymerizable acrylic and/or non-acrylic monomers.

Likewise epoxide group-containing acrylic resins may be produced by polymerizing epoxide group-containing acrylic monomers such as glycidyl (meth)acrylate, or copolymerizing the epoxide group-containing acrylic monomer with copolymerizable acrylic and/or non-acrylic monomers.

Examples of isocyanates having an alkenyl function to be reacted with hydroxyl group-containing acrylic resins include (meth)acryloylisocyanate, 2-isocyanatoethyl (meth)acrylate, or allylisocyanate. Examples of carboxylic acid anhydrides having an alkenyl function to be reacted with hydroxyl group-containing acrylic resins include itaconic anhydride, maleic anhydride or tetrahydrophthalic anhydride. Examples of olefin alcohols to be reacted with isocyanate group-containing acrylic resins include allyl alcohol, 3-buten-1-ol, 2-allyloxyethanol, glycerine diallyl ether, cyclohexenemethanol, 3-methyl-2-buten-1-ol, 3-methyl-3-buten-1-ol, 2-methyl-3-butene-2-ol, oleyl alcohol, crotyl alcohol and the like. Allyl glycidyl ether is a typical example of alkenyl group-containing epoxide compounds to be reacted with carboxyl group-containing acrylic resins. Examples of olefin carboxylic acids to be reacted with epoxide group-containing acrylic resins include allylacetic, (meth)acrylic, 2-butenoic, 3-butenoic, crotonic, undecylic or linoleic acid.

Alkenyl group-containing polyester resins may be produced by the polycondensation reaction of the above-mentioned olefin alcohols, a polyol component and a polycarboxylic acid component. Examples of polyols usable in the polycondensation reaction include ethylene glycol, propylene glycol, 1,6-hexanediol, diethylene glycol, neopentyl glycol, neopentyl glycol hydroxypivalate, trimethylolpropane, alcoholic hydroxyl group-terminated dimethylsiloxane and the like. Examples of polycarboxylic acids include phthalic anhydride, isophthalic acid, terephthalic acid, adipic acid, azelaic acid, trimellitic acid and the like. A small proportion of monoalcohols or monocarboxylic acids may be incorporated as desired. Alternatively, alkenyl group-containing polyester resins may be produced by reacting a carboxyl group-terminated polyester derived from the above-mentioned polyol and polycarboxylic acid components with an alkenyl group-containing epoxide compound, or reacting a hydroxyl group-terminated polyester with an isocyanate or acid anhydride having an alkenyl function.

Alkenyl group-containing epoxy resins may be produced by reacting, for example, bisphenol A diglycidyl ether with an olefin carboxyl acid as exemplified above, or reacting a hydroxy group-containing epoxy resin with an isocyanate or acid anhydride having the alkenyl function also as exemplied above.

As discussed supra, the above alkenyl group-containing polyether, acrylic, epoxy and polyester resins should have an iodine number ranging between 50 and 250, preferably between 70 and 200, and a number average molecular weight ranging between 300 and 20,000, preferably between 400 and 10,000. This is because if the iodine number or molecular weight is too low, the resin would be deficient in mechanical strength. Conversely if the iodine number or molecular weight is too high, the resulting film would be too rigid or too viscous to give an acceptable workability. Alkenyl group-containing polyether or acrylic resins are preferable.

The ratio of alkenyl group-containing polymer to hydrosilyl group-containing polymer in the curable resin composition of this invention is preferably adjusted so that 0.4 to 4 hydrogen atoms attached to the silicon atom are present for each alkenyl group. Within the above range it is possible to obtain a cured product having excellent weatherability, gloss and flexibility. If unreacted hydrosilyl or alkenyl functions remain excessively in the cured product, they would react with moisture or other contaminants to degrade the cured resin or film.

Self-crosslinkable resin

Instead of incorporating into a discrete polymer entity separate from the alkenyl group-containing polymer, the organohydrogenpolysiloxane macromonomer containing a hydrosilyl group and a (meth)acryloyloxypropyl group attached to the silicon atom may be incorporated into a single polymer entity together with an alkenyl function to obtain a polymer that crosslinks itself through a hydrosilylation reaction. To this end a hydrosilyl group-containing macromonomer such as macromonomers of the formula I, II or III may be copolymerized with an alkenyl group-containing acrylic monomer and optionally with an ethylenically unsaturated-monomer.

Examples of alkenyl group-containing acrylic monomers include allyl (meth)acrylate, 2-butenyl (meth)acrylate, 3-methyl-3-butenyl (meth)acrylate, 3-methyl-2-butenyl (meth)acrylate, cyclohexenylmethyl (meth)acrylate, 2-methyl-2-propenyl (meth)acrylate, 3-heptenyl (meth)acrylate, 4-hexenyl (meth)acrylate, CYCLOMER MF-401 (1:1 adduct of 2-hydroxethyl methacrylate and vinylcyclohexene monoepoxide sold by Daicel Chemical Industries, Ltd.), and vinyl-terminated polydimethylsiloxypropyl methacrylate of the formula:

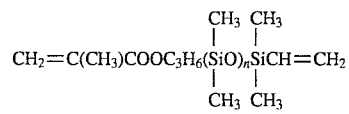

wherein n is an integer of 1–10.

Examples of optional monomers include acrylic monomers such as methyl(meth)acrylate, ethyl(meth)acrylate, n-butyl (meth)acrylate, isobutyl (meth)acrylate, t-butyl (meth)-acrylate, 2-ethylhexyl (meth)acrylate, lauryl (meth)-acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, adduct of 2-hydroxyethyl (meth)acrylate and ε-caprolactone (e.g. PLACCEL FM1 sold by Daicel Chemical Industries, Ltd.), glycidyl (meth)-acrylate, 3-trimethoxysilylpropyl (meth)acrylate, 3-triethoxysilyl-propyl (meth)acrylate, 3-dimethoxymethylsilylpropyl (meth)acrylate, (meth)acrylic acid, 2-acryloylamino-2-methylpropane sulfonic acid, acid phosphoxypropyl (meth)acrylate, tributyltin (meth)acrylate, (meth)acrylamide, (meth)acryloylisocyanate, 2-isocyanatoethyl (meth)acrylate, a silicone macromonomer sold under the name of SILAPRENE FM-0711 by Chisso Corporation, and a fluorine-containing acrylic monomer of the formula:

wherein R' is hydrogen or methyl, and n is 0–10. Non-acrylic monomers may also be copolymerized. Examples thereof include vinyl acetate, allyl acetate, vinyltrimethoxysilane, vinyltriethoxysilane, vinylmethyldimethoxysilane, vinylmethyldiethoxysilane, N-cyclohexylmaleimide, and N-phenylmaleimide.

The proportions of the macromonomer, alkenyl group-containing monomer and optional monomer may vary within a wide range and generally account for 1–99 parts, 99–1 parts and 0–80 parts, respectively, per 100 parts by weight of the mixture thereof. The monomer mixture may conveniently be polymerized by the conventional solution polymerization technique. When the alkenyl group-containing monomer contains a terminal ethylenic unsaturation such as allyl methacrylate or 3-butenyl methacrylate, the monomer mixture may be polymerized by the anion polymerization technique or the radical polymerization technique using a chain transfer agent. It is preferable for the resulting copolymers to have a number average molecular weight of 500–100,000.

Alternatively, the alkenyl group may be introduced into a copolymer derived from the hydrosilyl macromonomer and a comonomer containing an appropriate functional group. For example, allyl alcohol or 2-butenol may be reacted with a copolymer containing as monomeric units acrylic or methacrylic acid or with a copolymer containing as monomeric units an isocyanate group-containing monomer such as 2-isocyanatoethyl methacrylate, methacryloylisocyanate or m-isopropenyl-α,α-dimethylbenzylisocyanate. Likewise, acrylic or methacrylic acid may be reacted with a copolymer containing as monomeric units glycidyl methacrylate.

The copolymers having a hydrosilyl group and an alkenyl group in the molecule find use in producing a graft polymer by reacting a compound or polymer capable of selectively reacting with the hydrosilyl group or alkenyl group. For example, alkenyl group-containing graft polymers may be produced by the dehydrogenation reaction of hydrosilyl group with a hydroxy-terminated fluorocarbon compound in the presence of a rhodium catalyst. Hydrosilyl group-containing graft polymers may be produced by the reaction of alkenyl group with a sulhydryl-terminated compound in the presence of a radical initiator. However, the main and most important usage of the copolymers is a self-crosslinkable resin composition relying on the reaction between hydrosilyl and alkenyl groups. The resin composition may be used not only for coating purposes but also for potting and molding purposes. In order to obtain a curable resin composition having satisfactory weatherable, mechanical and other properties, the ratio of alkenyl group to hydrosilyl group of the copolymer should be such that 0.4 to 4 hydrogen atoms attached to the silicon atom are present for each alkenyl group.

Hydrosilylation catalyst

A hydrosilylation catalyst is required for the curing reaction of the composition of this invention. Usually Group VIII transional metals or their compounds are used. Specific examples thereof include $PtCl_4$; $H_2PtCl_6 \cdot 6H_2O$; platinum vinylsiloxane complex of the formula: $Ptn(ViMe_2SiOSiMe_2Vi)m$ wherein Vi is vinyl, Me is methyl, n and m are an integer; platinum phosphine complex of the formula: $Pt(PPh)_4$ wherein Ph is phenyl; platinum olefin complex of the formula: $PtCl_2(cod)$ wherein cod is cyclooctadiene; $Pt(acac)_2$ wherein acac is acetylacetonato; trans- or cis-$[PtCl_2(NH_2Pr)_2]$ wherein Pr is propyl; $PdCl_2(PPh_3)_2$; $PdCl_2(PhCN)_2$; $RhCl_2(PPh_3)_3$; $RhCl(cod)_2$; $Ru(cpd)_2$ wherein cpd is cyclopentadiene and the like. The catalyst may be added to the composition as a solution or dilution in a solvent such as alcohols, aromatic or aliphatic hydrocarbons, ketones and basic solvents. Platinum catalysts such as chloroplatinic acid are generally used. The amount of catalyst ranges between 5 and 10,000 ppm, preferably between 20 and 1,000 ppm relative to 100 parts by weight of the solids content of the composition. Excessive addition of catalyst may cause coloring of cured films and is uneconomical because Group VIII metals are generally expensive. The catalyst may be added in combination with an acetylenic compound capable of coordinating with platinum to retard its catalytic activity. Examples of such retardants include ethynyl alcohol, propargyl alcohol, 2-methyl-3-butyn-2-ol, 3-trimethylsiloxypropyne, 3-trimethylsiloxy-3,3-dimethylpropyne, bis(1,1-dimethyl-2-propynyloxy)dimethylsilane, bis(1,1-dimethyl-2-propynyloxy)diphenylsilane, bis(1,1-dimethyl-2-propynyloxy)phenylmethylsilane, and polymers of acrylate or methacrylate esters of α,α-dialkylpropargyl alcohol or its ethylene oxide adducts.

The following examples are given for illustrative purposes only. All parts and percents therein are by weight unless otherwise specified.

PRODUCTION EXAMPLE 1

A reactor equipped with a stirrer, thermometer, reflux condenser, nitrogen tube and drip funnel was charged with 90 parts of SOLVESSO 100 and heated to 130° C. with nitrogen gas bubbling. To this was added dropwise the following mixture at a constant rate over 3 hours.

| Material | Parts |
|---|---|
| $CH_3SiO(SiO)_{1.3}(SiO)_{6.7}SiCH_3$ with substituents $CH_3, CH_3, CH_3, CH_3$ on top and $CH_3, C_3H_6, H, CH_3$ below, with $OCOC(CH_3)=CH_2$ group | 50 |
| t-Butyl methacrylate | 50 |
| 2,2'-Azobis(methyl isobutyrate) | 6 |

After the addition, the mixture was allowed to react at 130° C. for 2 hours. Thereafter a solution of 0.5 parts of 2,2'-azobis(methyl isobutyrate) in 10 parts of SOLVESSO 100 was added dropwise over 30 minutes and mixture allowed to react for additional 2 hours at 130° C. A resin solution having 49.5% nonvolatiles and a Gardner viscosity C-D was obtained. The number average molecular weight of the resin measured by the GPC method (polystyrene standard) was 3,500. This product was hereinafter called "Resin solution A".

PRODUCTION EXAMPLE 2

A reactor as used in Production Example 1 was charged with 90 parts of xylene and heated to 120° C. with nitrogen gas bubbling. To this was added dropwise the following mixture at a constant rate over 3 hours.

| Material | Parts |
|---|---|
| $CH_3SiO(SiO)_2(SiO)_{1.3}(SiO)_{4.7}SiCH_3$ with substituents $CH_3, C_6H_5, CH_3, CH_3, CH_3$ on top and $CH_3, C_6H_5, C_3H_6, H, CH_3$ below, with $OCOC(CH_3)=CH_2$ group | 100 |
| 2,2'-Azobis(methyl isobutyrate) | 3 |

After the addition, the mixture was allowed react at 120° C. for 1 hour. Then a solution of 0.5 parts of 2,2'-azobis(methyl isobutyrate) in 10 parts of xylene was added dropwise over 30 minutes and the mixture allowed to react at 120° C. for additional 2 hours. The resulting resin solution was poured in a large amount of methanol. Then, precipitated resinous product was recovered by filtration and dried whereupon purified resin was recovered at a yield of 75% of theory. This resin was dissolved in xylene to 60.2% nonvolatiles to produce Resin solution B having a Gardner viscosity Z. The number average molecular weight measured by the GPC method was 8,550.

PRODUCTION EXAMPLE 3

A reactor as used in Production Example 1 was charged with 60 parts of xylene and heated to 120° C. with nitrogen gas bubbling. To this was added dropwise the following mixture at a constant rate over 3 hours.

| Material | Parts |
|---|---|
| CH₃SiO(SiO)₂(SiO)₁.₃(SiO)₄.₇SiCH₃ with side groups CH₃, C₆H₅, CH₃, CH₃, CH₃ / CH₃, C₆H₅, C₃H₆, H, CH₃; C₃H₆–OCOC(CH₃)=CH₂ | 70 |
| Cyclohexyl methacrylate | 30 |
| 2,2'-Azobis(methyl isobutyrate) | 3 |

After the addition, the mixture was allowed to react at 120° C. for 1 hour. Thereafter a solution of 0.5 parts of 2,2'-azobis(methyl isobutyrate) in 6.7 parts of xylene was added dropwise over 30 minutes and mixture allowed to react at 120° C. for additional 2 hours to obtain Resin solution C having 58.6% nonvolatile and a Gardner viscosity V. The number average molecular weight was 5,530.

PRODUCTION EXAMPLE 4

Production Example 1 was followed using the following mixture.

| Material | Parts |
|---|---|
| HSiO(SiO)₆SiO(SiO)₃SiH with side groups CH₃, CH₃, CH₃, CH₃, CH₃ / CH₃, CH₃, H, CH₃; C₃H₆–OCOC(CH₃)=CH₂ | 30 |
| Cyclohexyl methacrylate | 30 |
| t-Butyl methacrylate | 40 |
| 2,2'-Azobis(methyl isobutyrate) | 3 |

A resin solution called Resin solution D having 50.2% nonvolatiles and a Gardner viscosity F was obtained. The number average molecular weight was 4,320.

PRODUCTION EXAMPLE 5

A reactor as used in Production Example 1 was charged with 100 parts of HPE-1030(polyether resin sold by Daicel Chemical Industries, Ltd.) and heated to 120° C. with nitrogen gas bubbling. To this was added dropwise the following mixture at a constant rate over 3 hours for in situ polymerization.

| Material | Parts |
|---|---|
| CH₃SiO(SiO)₁.₃(SiO)₆.₇SiCH₃ with side groups CH₃, CH₃, CH₃, CH₃ / CH₃, C₃H₆, H, CH₃; C₃H₆–OCOC(CH₃)=CH₂ | 70 |
| 2-Ethylhexyl acrylate | 20 |

| Material | Parts |
|---|---|
| 2,4-Diphenyl-4-methyl-1-pentene | 10 |
| 2,2'-Azobis(methyl isobutyrate) | 5 |

After the addition, the mixture was allowed to react at 130° C. for 1 hour. Thereafter 0.5 parts of 2,2'-azobis(methyl isobutylate) were added portionwise over 30 minutes and the mixture allowed to reacted at 130° C. for additional 2 hours. A resin solution called Resin solution E having 98.2% nonvolatile and a Gardner viscosity Z1-Z2 was obtained.

PRODUCTION EXAMPLE 6

A reactor as used in Production Example 1 was charged with 90 parts of SOLVESSO 100 and heated to 120° C. with nitoregen gas bubbling. To this was added the following mixture at a constant rate over 3 hours.

| Material | Parts |
|---|---|
| 3-Methyl-3-butenyl methacrylate | 50 |
| Styrene | 30 |
| t-Butyl methacrylate | 20 |
| 2,2'-Azobis(2-methylbutyronitrile) | 5 |

After the addition, a solution of 0.5 parts of 2,2'-azobis(2-methylbutyronitrile) in 4.5 parts of SOLVESSO 100 was added dropwise over 30 minutes and mixture allowed to react at 120° C. for an additional 2 hours. A resin solution called Resin solution F having 51.9% nonvolatiles and a Gardner viscosity H was obtained. The number average molecular weight was 5,000.

PRODUCTION EXAMPLE 7

A reactor as used in Production Example 1 was charged with 90 parts of SOLVESSO 100 and heated to 120° C. with nitrogen gas bubbling. To this was added dropwise the following mixture at a constant rate over 3 hours.

| Material | Parts |
|---|---|
| CH₂=C(CH₃)COOC₃H₆SiOSiH with side groups CH₃, CH₃ / CH₃, CH₃ | 40 |
| Cyclohexyl methacrylate | 30 |
| t-Butyl methacrylate | 20 |
| 2,2'-Azobis(methyl isobutyrate) | 3 |

After the addition, a solution of 0.5 parts of 2,2'-azobis-(methyl isobutyrate) in 10 parts of SOLVESSO 100 was added dropwise over 30 minutes and the mixture allowed to react at 120° C. for additional 2 hours. A resin solution called Resin solution G having 50.5% nonvolatiles and a Gardner viscosity H was obtained. The number average molecular. weight was 6,500.

Example 1

A coating composition consisting of 122 parts of Resin solution A, 39 parts of HPE-1030 (alkenyl group-containing polyether resin sold by Daicel Chemical Industries, Ltd.) and 1.5 parts of 2% ethanolic solution of chloroplatinic acid ($H_2PtCl_6 \cdot 6H_2O$) was applied onto a steel plate to a dry film thickness of 20 microns, allowed to set for 2 hours and baked at 140° C. for 25 minutes. The cured film was tested for various properties. The results are shown in Table 1.

Example 2

A coating composition consisting of 71 parts of Resin solution B, 114 parts of Resin solution F and 1.5 parts of 2% ethanolic solution of chloroplatinic acid was applied onto a steel plate, allowed to set and baked as in Example 1. Properties of cured film are shown in Table 1.

Example 3

A coating composition consisting of 100 parts of Resin solution C, 40 parts of HPE-1060(alkenyl group-containing polyether sold by Daicel Chemical Industries, Ltd.) and 1.0 parts of 2% ethanolic solution of chloroplatinic acid was applied onto a steel plate, allowed to set and baked as in Example 1. Properties of cured film are shown in Table 1.

Example 4

A coating composition consisting of 67 parts of Resin solution D, 67 parts of HPE-10601C(alkenyl group-containing polyether sold by Daicel Chemical Industries, Ltd.) and 3.0 parts of 2% ethanolic solution of chloroplatinic acid was applied onto a steel plate, allowed to set and baked as in Example 1. Properties of cured film are shown in Table 1.

Example 5

A coating composition consisting of 100 parts of Resin solution E and 1.5 parts of 2% ethanolic solution of chloroplatinic acid was applied onto a steel plate, allowed to set and baked as in Example 1. Properties of cured film are shown in Table 1.

Example 6

A coating composition consisting of 100 parts of Resin solution G, 25 parts of HPE-1030 and 1.0 parts of 2% ethanolic solution of chloroplatinic acid was applied onto a steel plate, allowed to set and baked as in Example 1. Properties of the cured film are shown in Table 1.

Comparative Example 1

A coating composition was produced by thoroughly mixing 100 parts of Resin solution F, 16 parts of methylhydrogenpolysiloxane of the formula:

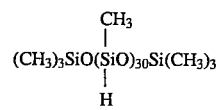

and 1 part of 2% ethanolic solution of chloroplatinic acid.

A cured film was prepared from this composition as in Example 1 and tested for film properties. The results are shown also in Table 1.

TABLE 1

| TEST ITEM | EXAMPLE | | | | | | COMPARATIVE EXAMPLE |
|---|---|---|---|---|---|---|---|
| | 1 | 2 | 3 | 4 | 5 | 6 | 1 |
| Pencil hardness 1) | H | H | 2 H | HB | H | HB | H |
| Tg, °C. 2) | 101 | 93 | 131 | 85 | 104 | 84 | 90 |
| Xylene rubbing test 3) | No Change | No Change | No Change | No Change | No Change | No Change | Dissolved at 30 recipns. |
| Acid resistance 4) | Very good | Very good | Very good | Good | Very good | Very good | Very good |
| Initial gloss 5) | 89 | 87 | 90 | 92 | 88 | 87 | 72 |
| % Retention of initial gloss after weathering 6) | 90 | 87 | 93 | 88 | 87 | 90 | 80 |
| Appearance after weathering 7) | No Change | No Change | No Change | No Change | No Change | No Change | Partly chalking |

Footnotes of Table 1
1) Determined according to JIS K 5400 paragraph 1–14.
2) Determined by the dynamic viscoelasticity test at a frequency of 11 Hz at a temperature-elevating rate of 2° C./min. Tg is the temperature at which the temperature dispersion of tan δ is maximum.
3) The specimen was rubbed with a degreased cotton wool piece of about 1 cm × 1 cm size impregnated with xylene at 100 reciprocations and the change of appearance if any was observed visually.
4) A drop (0,2 ml) of 0.1N sulfuric acid was placed on the film, allowed to stand for 24 hours at 20° C. at 75% RH, and dried at 60° C. for 10 minutes. Then the degree of deterioration of the film was visually determined.
5) 40 parts of titanium dioxide pigment (TIPEK R-820, Ishihara Sangyo Kaisha, Ltd.) were dispersed in 100 parts as solids of each composition. A cured film was prepared from this white paint as in Examples and tested for 60° gloss.
6) The specimen tested for initial gloss was subjected to weathering in a sunshine weather meter for 2,000 hours and % retention of initial gloss was measured.
7) The specimen tested for initial gloss was subjected to weathering as above and change in appearance was visually observed.

PRODUCTION EXAMPLE 8

A reactor equipped with a stirrer, thermometer, reflux condenser, nitrogen tube and drip funnel was charged with 90 parts of SOLVESSO 100 and heated to 130° C. with nitrogen gas bubbling. To this was added dropwise the following mixture at a constant rate over 3 hours.

| Material | Parts |
|---|---|
| 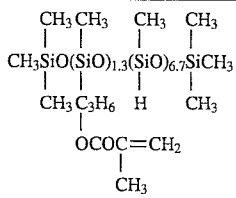 | 30 |
| Cyclohexenylmethyl methacrylate | 30 |
| t-Butyl methacrylate | 40 |
| 2,2'-Azobis(methyl isobutylate) | 6 |

After the addition, the mixture was allowed to react at 130° C. for 1 hour. Thereafter a solution of 0.5 parts of 2,2'-azobis(methyl isobutyrate) in 10 parts of xylene was added dropwise over 30 minutes and the mixture allowed to react at 130° C. for additional 2 hours. A clear solution called Resin solution H having 49.5% nonvolatiles and a Gardner viscosity C-D was obtained. The number average molecular weight measured by the GPC method was 3,200. IR spectrometry demonstrated the presence of SiH at 2150 cm$^{-1}$ and alkenyl(cyclohexenyl) at 1650 cm$^{-1}$.

PRODUCTION EXAMPLE 9

A reactor as used in Production Example 8 was charged with 90 parts of xylene and heated to 120° C. with nitrogen gas bubbling. To this was added dropwise the following mixture at a constant rate over 3 hours.

| Material | Parts |
|---|---|
| 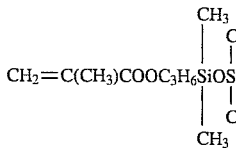 | 43 |
| 3-Methyl-3-butenyl methacrylate | 30 |
| Cyclohexenylmethyl methacrylate | 27 |
| 2,2'-Azobis(methyl isobutylate) | 3 |

After the addition, the mixture was allowed to react at 120° C. for 1 hour. Thereafter a solution of 0.5 parts of 2,2'-azobis(methyl isobutyrate) in 10 parts of xylene was added dropwise over 30 minutes and the mixture allowed to react at 120° C. for additional 2 hours. A clear solution called Resin solution I having 50.2% nonvolatiles and a Gardner viscosity F was obtained. The number average molecular weight was 5,700. IR spectrometry demonstrated the presence of SiH at 2150 cm$^{-1}$ and alkenyl (butenyl) at 1650 cm$^{-1}$.

PRODUCTION EXAMPLE 10

A reactor as used in Production Example 8 was charged with 90 parts of xylene and heated to 110° C. with nitrogen gas bubbling. To this was added dropwise the following mixture at a constant rate.

| Material | Parts |
|---|---|
| 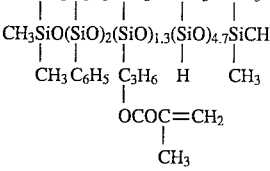 | 30 |
| 2-Butenyl methacrylate | 30 |
| Methyl methacrylate | 20 |
| Styrene | 20 |
| t-Butylperoxy 2-ethylhexanoate | 2 |

After the addition, the mixture was allowed to react at 110° C. for 1 hour. Thereafter a solution of 0.5 parts of t-butylperoxy 2-ethylhexanoate in 6.7 parts of xylene was added dropwise over 30 minutes and the mixture allowed to react at 110° C. for additional 2 hours. A clear solution called Resin solution J having 58.6% nonvolatiles and a Gardner viscosity Z was obtained. The number average molecular weight was 11,000. IR spectrometry demonstrated the presence of SiH at 2150 cm$^{-1}$ and alkenyl (2-butenyl) at 1680 cm$^{-1}$.

PRODUCTION EXAMPLE 11

Production Example 8 was followed using the following mixture.

| Material | Parts |
|---|---|
| 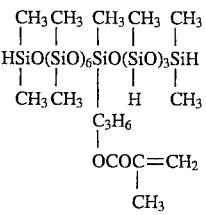 | 20 |
| 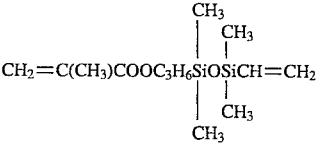 | 40 |
| Cyclohexyl methacrylate | 20 |
| t-Butyl methacrylate | 20 |
| 2,2'-Azobis(methyl isobutyrate) | 6 |

A clear solution called Resin solution K having 50.2% nonvolatiles and a Gardner viscosity D was obtained. The number average molecular weight was 3,400. IR spectometry demonstrated the presence of SiH at 2150 cm$^{-1}$ and alkenyl (vinyl) at 1600 cm$^{-1}$.

PRODUCTION EXAMPLE 12

A reactor as used in Production Example 8 was charged with 60 parts of xylene and heated to 110° C. with nitrogen gas bubbling. To this was added dropwise the following mixture over 3 hours at a constant rate.

| Material | Parts |
|---|---|
| CH₃ CH₃<br>\|   \|<br>CH₂=C(CH₃)COOC₃H₆(SiO)₅SiH<br>\|   \|<br>CH₃ CH₃ | 10 |
| Allyl methacrylate | 15 |
| 2-Ethylhexyl acrylate | 20 |
| Methyl methacrylate | 35 |
| n-Butyl methacrylate | 10 |
| 2,4-Diphenyl-4-methyl-1-pentene | 10 |
| 2,2'-Azobis(methylisobutyronitrile) | 2 |

After the addition, the mixture was allowed to react at 110° C. for 1 hour. Thereafter a solution of 0.2 parts of 2,2'-azobis(methylisobutyronitrile) in 6.67 parts of xylene was added dropwise over 30 minutes and the mixture allowed to react at 110° C. for additional 2 hours. A clear solution called Resin solution L having 61.2% nonvolatiles and a Gardner viscosity Z1–Z2 was obtained. IR spectrometry demonstrated the presence of SiH at 2150 cm$^{-1}$ and alkenyl(allyl) at 1600 cm$^{-1}$.

PRODUCTION EXAMPLE 13

Production Example 8 was followed using the following mixture.

| Material | Parts |
|---|---|
| CH₃ CH₃   CH₃ CH₃<br>\|   \|     \|   \|<br>CH₃SiO(SiO)₁.₃(SiO)₆.₇SiCH₃<br>\|   \|     \|   \|<br>CH₃ C₃H₆  H   CH₃<br>      \|<br>      OCOC=CH₂<br>          \|<br>          CH₃ | 40 |
| Cyclohexenylmethyl methacrylate | 40 |
| Perfluorononylmethyl methacrylate | 20 |
| 2,2'-Azobis(methylisobutyronitrile) | 6 |

A clear solution called Resin solution M having 48.6% nonvolatiles and a Gardner viscosity F-G was obtained. The number average molecular weight was 3,800. IR spectrometry demonstrated the presence of SiH at 2150 cm$^{-1}$ and alkenyl(cyclohexenyl) at 1650 cm$^{-1}$:

PRODUCTION EXAMPLE 14

A reactor as used in Production Example 8 was charged with 90 parts of SOLVESSO 100 and heated to 120° C. To this was added dropwise the following mixture.

| Material | Parts |
|---|---|
| CH₃ CH₃   CH₃ CH₃<br>\|   \|     \|   \|<br>CH₃SiO(SiO)₁.₃(SiO)₆.₇SiCH₃<br>\|   \|     \|   \|<br>CH₃ C₃H₆  H   CH₃<br>      \|<br>      OCOC=CH₂<br>          \|<br>          CH₃ | 40 |
| 2-Isocyanatoethyl methacrylate | 20 |
| Cyclohexyl methacrylate | 20 |
| 2,2'-Azobis(methylisobutyronitrile) | 3 |

After the addition, the mixture was allowed to react at 20° C. for 1 hour. Thereafter a solution of 0.5 parts of 2,2'-azobis(methylisobutyrate) in 10 parts of SOLVESSO 100 dropwise over 30 minutes and the mixture allowed to react at 120° C. for additional 2 hours. After cooling the mixture at 80° C., 22.2 parts of 3-methyl-3-butene-1-ol were added dropwise over 30 minutes and allowed to react at 100° C. for 2 hours. A clear solution called Resin solution N having 55.2% nonvolatiles and a Gardner viscosity Z was obtained. The number average molecular weight was 8,200.

Example 7

100 parts of Resin solution H were thoroughly mixed with 1.5 parts of 2% ethanolic solution of chloroplatinic acid, applied onto a steel plate to a dry film thickness of 20 microns, allowed to set for 2 hours, and baked at 140° C. for 25 minutes. The cured film was evaluated as in Examples 1–6. The results are shown in Table 2.

Example 8

100 parts of Resin solution I were thoroughly mixed with 1.0 parts of 2% ethanolic solution of chloroplatinic acid. A cured film was prepared from this composition as in Example 7 and tested for various properties. The results obtained are shown in Table 2.

Example 9

100 parts of Resin solution J were thoroughly mixed with 1.0 parts of 2% ethanolic solution of chloroplatinic acid. A cured film was prepared from this composition as in Example 7 and tested for various properties. The results obtained are shown in Table 2.

Example 10

100 parts of Resin solution K were thoroughly mixed with 1.5 parts of 2% ethanolic solution of chloroplatinic acid. A cured film was prepared from this composition as in Example 7 and tested for various properties. The results obtained are shown in Table 2.

Example 11

100 parts of Resin solution L were thoroughly mixed with 1.0 parts of 2% ethanolic solution of chloroplatinic acid. A cured film was prepared from this composition as in Example 7 and tested for various properties. The results obtained are shown in Table 2.

Example 12

100 parts of Resin solution M were thoroughly mixed with 1.5 parts of 2% ethanolic solution of chloroplatinic acid. A cured film was prepared from this composition as in Example 7 and tested for various properties. The results obtained are shown in Table 2.

Example 13

100 parts of Resin solution N were thoroughly mixed with 1.5 parts of 2% ethanolic solution of chloroplatinic acid. A cured film was prepared from this composition as in Example 7 and tested for various properties. The results obtained are shown in Table 2.

COMPARATIVE EXAMPLE 2

A reactor as used in Production Example 8 was charged with 60 parts of xylene and heated to 110° C. with nitrogen gas bubbling. To this was added dropwise the following mixture over 3 hours at a constant rate.

| Material | Parts |
| --- | --- |
| Allyl methacrylate | 25 |
| Methyl methacrylate | 58 |
| 2,4-Diphenyl-4-methyl-1-pentene | 17 |
| 2,2'-Azobis(methylisobutyronitrile) | 2 |

After the addition, a solution of 0.2 parts of 2,2-azobis-(methylisobutyronitrile) in 6.7 parts of xylene was added dropwise over 30 minutes and the mixture allowed to react at 110° C. for additional 2 hours. A clear solution called Resin solution O having 60.1% nonvolatiles and a Gardner viscosity U was obtained. The number average molecular weight was 5,500.

100 parts of Resin solution O, 16 parts of methylhydrogenpolysiloxane of the formula:

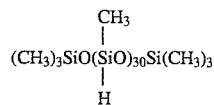

and 1.5 parts of 2% ethanolic solution of chloroplatinic acid were thoroughly mixed whereupon a cloudy composition was obtained. A cured film was prepared from this composition as in Example 7 and tested for various properties. The results obtained are shown in Table 2.

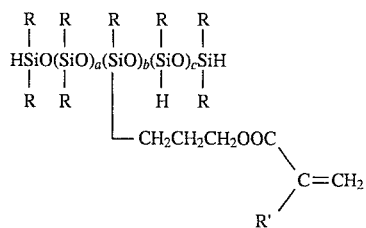

wherein R is a $C_1$–$C_6$ alkyl or phenyl, R' is hydrogen or methyl, a is a real number of from 0 to 20, b is a real number of from 0.5 to 3, and c is a real number of from 0 to 10.

3. The curable resin composition of claim 1, wherein said macromonomer has an average composition of:

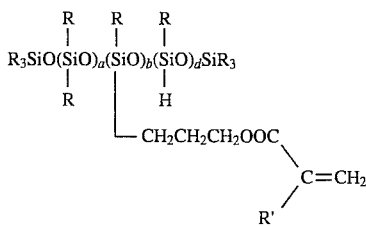

wherein R is a $C_1$–$C_6$ alkyl or phenyl, R' is hydrogen or methyl, a is a real number of from 0 to 20, b is a real number of from 0.5 to 3 and d is a real number of from 1 to 10.

TABLE 2

| TEST ITEM 1) | EXAMPLE | | | | | | | COMP. EX. |
| --- | --- | --- | --- | --- | --- | --- | --- | --- |
|  | 7 | 8 | 9 | 10 | 11 | 12 | 13 | 2 |
| Pencil hardness | 2 H | F | H | HB | H | H | H | H |
| Tg, °C. | 112 | 78 | 105 | 59 | 104 | 96 | 115 | 90 |
| Xylene rubbing test | No Change | No Change | No Change | No Change | No Change | No Change | No Change | Dissolved at 30 recipns. |
| Acid resistance | Very good | Very good | Very good | Very good | Good | Very good | Very good | Very good |
| Initial gloss | 88 | 87 | 92 | 88 | 90 | 88 | 91 | 72 |
| % Retention of initial gloss after weathering | 95 | 89 | 87 | 88 | 92 | 100 | 90 | 80 |
| Appearance after weathering | No Change | No Change | No Change | No Change | No Change | No Change | No Change | Partly chalking |

1) Test conditions are shown in footnotes of Table 1.

We claim:

1. A curable resin composition comprising:
   (a) an acrylic copolymer having (i) an organohydrogenpolysiloxane macromonomer unit having a silicon-hydrogen bond and a 3-(meth)acryloyloxypropyl group attached to the silicon atom, (ii) an alkenyl group-containing acrylic monomer unit, and optionally (iii) an ethylenically unsaturated monomer unit, and
   (b) a catalytically effective amount of a hydrosilylation catalyst.

2. The curable resin composition of claim 1, wherein said macromonomer has an average composition of:

4. The curable resin composition of claim 1, wherein said macromonomer has an average composition of:

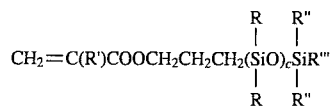

wherein R is a $C_1$–$C_6$ alkyl or phenyl, R' is hydrogen or methyl, R" is the same as R or a group $-OSi(R)_2H$, R''' is hydrogen when R" is the same as R or otherwise a group $-OSi(R)_2H$, and c is a real number of from 0 to 10.

5. The curable resin composition of claim 1, wherein said acrylic copolymer is produced by copolymerizing a monomeric composition comprising said macromonomer and said alkenyl group-containing monomer.

6. The curable resin composition of claim 4, wherein said alkenyl group-containing acrylic monomer is allyl (meth)acrylate, 2-butenyl (meth)acrylate, 3-methyl-3-butenyl (meth)acrylate, cyclohexenylmethyl (meth)acrylate, 2-methyl-2-propenyl (meth)acrylate, 3-heptenyl (meth)acrylate, 4-hexenyl (meth)acrylate, adduct of 2-hydroxyethyl methacrylate with vinylcyclohexene monoepoxide, or vinyl-terminated polydimethylsiloxypropyl (meth)acrylate.

7. The curable resin composition of claim 1, wherein said acrylic copolymer is produced by copolymerizing a monomeric composition comprising said macromonomer and an acrylic monomer having a carboxyl, glycidyl or isocyanato group, and then reacting the resulting copolymer with an alkenol or alkenoic acid.

8. The curable resin composition according to claim 1, wherein said hydrosilylation catalyst is a platinum compound.

9. The curable resin composition according to claim 1, wherein the proportions of said macromonomer unit and said alkenyl monomer unit in said copolymer is such that 0.4 to 4 atoms of the hydrogen atom attached to the silicon atom are present for each alkenyl group.

10. The curable resin composition according to claim 1, wherein said catalyst is present in said composition in an amount between 5 to 10,000 ppm relative to 100 parts by weight of solids of said composition.

11. The curable resin composition of claim 1, wherein the acrylic copolymer (a) is self-crosslinkable.

* * * * *